United States Patent [19]

Natansohn et al.

[11] Patent Number: 4,619,905

[45] Date of Patent: Oct. 28, 1986

[54] PROCESS FOR THE SYNTHESIS OF SILICON NITRIDE

[75] Inventors: Samuel Natansohn; Gary Czupryna, both of Sharon, Mass.

[73] Assignee: GTE Laboratories Incorporated, Waltham, Mass.

[21] Appl. No.: 685,926

[22] Filed: Dec. 24, 1984

[51] Int. Cl.⁴ .............................................. C04B 35/58
[52] U.S. Cl. ...................................... 501/97; 423/344
[58] Field of Search .................. 423/344; 501/97, 154, 501/152

[56] References Cited

U.S. PATENT DOCUMENTS

| | | | |
|---|---|---|---|
| 4,073,845 | 2/1978 | Buljan et al. | 501/152 |
| 4,122,152 | 10/1978 | Mori et al. | 423/344 |
| 4,280,850 | 7/1981 | Smith et al. | 501/154 |
| 4,425,141 | 1/1984 | Buljan et al. | 51/309 |
| 4,514,370 | 4/1985 | Inoue et al. | 423/344 |

FOREIGN PATENT DOCUMENTS

| | | | |
|---|---|---|---|
| 80050 | 6/1983 | European Pat. Off. | 423/344 |
| 1470171 | 4/1977 | United Kingdom | 423/344 |

Primary Examiner—Helen M. McCarthy
Attorney, Agent, or Firm—Ivan L. Ericson

[57] ABSTRACT

A process for the preparation of silicon nitride powders, which are suitable for the manufacture of high quality structural ceramics is described. The synthesis process is based on the reduction of silicon dioxide by carbon in a nitrogen stream at elevated temperatures to form alpha silicon nitride. Silicon nitride powders of various morphologies are obtained by this technique by varying either the type of reactants used or the process conditions. Structural ceramics with densities exceeding 99% of theoretical and having satisfactory mechanical strength and oxidation resistance were sintered from powders synthesized by the method of this invention.

17 Claims, 6 Drawing Figures 1,000 X
10 μm 10,000 X
1 μm

├── 10,000X
1μm

├── 10,000 X
1μm

PROCESS FOR THE SYNTHESIS OF SILICON NITRIDE

FIELD OF THE INVENTION

This invention relates to a method of making silicon nitride powders and densified articles therefrom. More particularly, it relates to a method of making silicon nitride powders by the reduction of silicon dioxide by carbon to form silicon nitride.

BACKGROUND

Silicon nitride ceramics are the preferred material for components in advanced heat engines because of their superior mechanical strength, especially at high temperatures, excellent thermal shock resistance and good oxidation resistance. The utilization of the superior performance inherent in silicon nitride ceramics as well as their application in a broad range of vehicular and industrial products is predicated upon the availability of reasonably priced silicon nitride powders with consistent and reproducible properties.

The three major industrially used techniques for the synthesis of silicon nitride are:

1. The reaction between silicon and nitrogen, the so called nitridation of silicon;
2. The reaction between silicon tetrachloride (or some halogenated silane compound) and ammonia;
3. The reaction between silicon dioxide and nitrogen in the presence of carbon, the so called carbothermic reduction of silicon dioxide.

The nitridation of silicon is kinetically a slow process and metallic catalysts, typically iron, are added to the system to produce useful yields. This necessitates subsequent treatment of the product to remove the objectionable metallic impurities. Powders produced by this technique are difficult to sinter to maximum density and are not suitable for the most rigorous structural ceramics applications.

The vapor phase reaction between silicon tetrachloride and ammonia produces, in addition to silicon nitride, a variety of by-products which require expensive processing for their removal. In addition, the synthesis process is difficult to control and all too often gives inconsistent results. Good powders prepared by this method have been used successfully in a variety of structural ceramics. However, the production costs for this material are too high for wide industrial use.

The carbothermic reduction of silicon dioxide as taught in the existing patent literature, is also unsatisfactory and fraught with difficulties. Thus, U.S. Pat. No. 4,117,095 to Komeya et al. requires the addition of elementary silicon to the reaction mixture of silicon dioxide and carbon. This is undesirable not only because of the cost in that silicon of comparable particle size and purity is more expensive then silicon dioxide but also because any small residue of silicon not converted to silicon nitride would adversely affect the properties of the structural ceramic made from the powder. U.S. Pat. No. 4,122,152 to Mori et al. specifies the use of carbon powder having an oil absorption of no less than 100 ml/100 g which again increases the cost of the powder by using a more expensive reactant (carbons with a high oil absorption are generally more expensive than those with low oil absorption). Another variation, as described in U.S. Pat. No. 4,396,587 to Yamaguchi et al., teaches the use of precursors such as liquid silicic acid for the silicon component and carbonaceous substances for the carbon reductant. This introduces additional expense, both in terms of the reagent cost and the extra processing required. The use of silicic acid, as taught in this patent, is particularly undesirable because it was obtained from water glass, a sodium silicate, by ion exchange. Any sodium residue in the powder, even of the order of 100 ppm, is detrimental to the properties of silicon nitride structural ceramics. Still another patent, U.S. Pat. No. 4,414,190 to Seimiya and Nishida, teaches the use of a silicon dioxide dispersion, the so called white carbon, which is obtained from an alkali or alkali earth metal silicate. This process is objectionable for the same reasons as the preceding one.

This review indicates that the carbothermic reduction process for the preparation of silicon nitride, as taught by these inventions, is inadequate for the costeffective preparation of powders useful in structural ceramics applications. There has been no mention made that any of these powders is sinterable to high density or that the resulting ceramics possess the requisite mechanical strength and oxidation resistance.

OBJECTS OF THE INVENTION

Accordingly, it is an object of the present invention to provide a method for the cost-effective preparation of silicon nitride powders which is readily scalable to industrial production.

It is another object of this invention to provide a method for the synthesis of silicon nitride powders of requisite crystalline phase and chemical purity which are sinterable to ceramics of high density, mechanical strength and oxidation resistance.

It is still another object of this invention to provide a method for synthesizing silicon nitride powders of varying but controllable particle size and morphology.

These and other objects of the present invention will become apparent from the description contained herein.

SUMMARY OF THE INVENTION

In accordance with one aspect of the present invention there is provided an improved method for making silicon nitride powder. The method comprises the steps:

Step 1. Carbon and silicon dioxide having a weight ratio from about 1 to about 4 are mixed to form a powder mixture.

Step 2. The powder mixture from step 1 is heated from about 1400° C. to about 1550° C. in a nitrogen stream which has a velocity from about 1 to about 3 cm/sec for a time sufficient to form silicon nitride.

Step 3. The product from step 2 is heat treated in air at about 600° C. to about 700° C. for a time sufficient to completely oxidize residual carbon remaining.

In accordance with another aspect of the present invention a densified ceramic article having a densification aid is made from silicon nitride powder produced by the method of the present invention by mixing the densification aid with the silicon nitride powder followed by a densification step.

Figure 1:
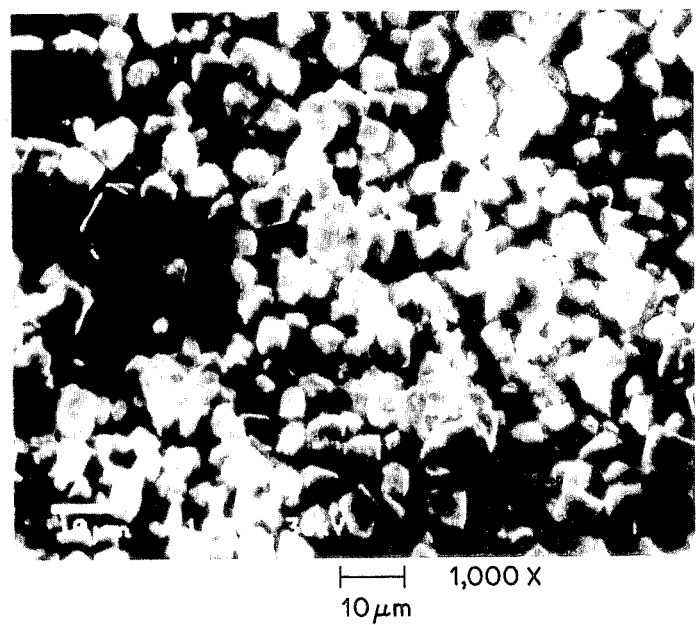
FIG. 1 is a scanning electron photomicrograph (SEPM) of a silicon nitride powder made by the process of the instant invention. The SEPM is magnified 1,000 times (1,000×).

For a better understanding of the present invention, together with other and further objects, advantages and capabilities thereof, reference is made to the following disclosure and appended claims in connection with the above-described drawings.

DESCRIPTION

The process of this invention is based on the reduction of silicon dioxide by carbon at high temperatures in the presence of nitrogen to form silicon nitride. The overall reaction may be represented as $$3 SiO_2 + 6 C + 2 N_2 \rightarrow Si_3N_4 + 6 CO \quad (1)$$

but the actual reaction mechanism probably proceeds via the formation of silicon monoxide which then reacts with the nitrogen gas to form silicon nitride. The operative reactions may be $$SiO_2 + C \rightarrow SiO + CO \quad (2)$$

$$SiO_2 + CO \rightarrow SiO + CO_2 \quad (3)$$

$$CO_2 + C \rightarrow 2 CO \quad (4)$$

$$3 SiO + 3 C + 2 N_2 \rightarrow Si_3N_4 + 3 CO \quad (5)$$

The silicon dioxide and carbon reactants are mixed intimately together to form a homogeneous reaction mixture. Mechanical mixing in the form of an aqueous or organic slurry was found to be perfectly satisfactory in achieving a suitable reaction mixture but other techniques such as spray drying, freeze drying etc. may also be used effectively. The slurry is dried to a cake which is pulverized to a fluffy powder.

The silicon dioxide and carbon reactants are materials with high surface area. Many commercial silicon dioxide materials or silicon dioxide precursors, i.e., siliceous compounds which upon heating would decompose or convert to silicon dioxide, were found useful in this process and could be reduced to silicon nitride. However, the preferred silicon dioxide reactants based on reactivity, purity and cost are the Cab-O-Sil fumed silicon dioxide materials manufactured by the Cabot Corporation of Boston, MA especially grades M-5, HS-5, and S-17. Of these, the M-5 grade is the material of choice because it is the lowest priced one and the two others HS-5 and S-17, offered no visible advantage in reactivity in spite of their larger surface area to justify the added expense.

The number of carbon reactants that can be used to reduce silicon dioxide to silicon nitride in a nitrogen stream at high temperatures is very large; almost any carbon or carbonaceous material is effective. Most of the carbon blacks shown to be effective in the process of this invention had oil absorption numbers below 100 ml/100 grams, some as low as 50 ml/100 grams. Indeed, among the preferred carbon black materials which produce silicon nitride of superior characteristics are two materials manufactured by the Cabot Corporation of Boston, MA, grades Monarch 1100 and Monarch 800 which have an oil absorption number of 60 and 75 ml/100 grams, respectively. This is an unexpected and surprising finding in view of the teachings of U.S. Pat. No. 4,122,152 to Mori et al. which say that the carbon component of the reaction mixture have an oil absorption number of no less than 100 ml/100 grams. Other carbon materials found to produce superior silicon nitride powders are Conductex SC (manufactured by Columbian Chemicals Company of Tulsa, OK) and Desulco #9039 (manufactured by Superior Graphite Company of Chicago, IL). All these materials are standard articles of commerce, manufactured in tonnage quantities and available at reasonable prices so that the raw materials costs in the production of silicon nitride by this method are economical.

The carbon and silicon dioxide are mixed in a weight ratio which is in the range of 1 to 4 with the preferred ratio being in the range of 1.5 to 2.0. The amount of carbon is in excess of the stoichiometric one which is required for complete conversion of the silicon dioxide to silicon nitride in a reasonable time span. Carbon amounts in excess of the indicated range offer no technical advantage and only add to the materials costs.

The reactant mixture consisting of carbon and silicon dioxide is placed in a container such as a tray or a boat made of a suitable material such as graphite or another inert refractory and then heated in a furnace at temperatures in the range of 1400° C.–1550° C. in a nitrogen stream. There is little silicon nitride formation below 1400° C. and significant formation of silicon carbide above 1550° C. because silicon carbide is thermodynamically the more stable species at higher temperatures. The preferred synthesis temperatures are in the 1450° C.–1500° C. range with the material being heated at peak temperature for 2–10 hours, typically 4 hours.

Any standard industrial furnace capable of the indicated temperature range can be used for the synthesis of silicon nitride by this method. A useful furnace for this purpose could be the so called pusher tunnel furnace in which trays containing the reactant mixture are pushed in a continuous manner through the hot zone of the furnace. Another possibility is a rotary furnace in which the reactant mixture itself is propagated by tumbling through an inclined rotating refractory tube furnace. In the latter case the residence time at peak temperature may be shortened substantially, most likely to well below one hour, because the continuous tumbling motion of the reactant mixture provides the greatest and most uniform exposure of the powder particle surfaces to the nitriding gas, a condition which enhances the synthesis of silicon nitride. Either of these furnaces are standard equipment in industrial practice and capable of manufacturing large quantities of material at nominal capital investment and low processing cost. Other possible configurations of manufacturing equipment are those based on the various forms of solid-gas reactors, such as packed bed, moving bed or either batch or continuous fluidized bed reactors. The cost-effectiveness of the method of this invention is thus the result of not only the low cost of the reactants but also of the low processing cost.

A nitrogen flow is maintained through the furnace at a velocity of 1–3 cm/sec with the preferred velocity being in the 1.2–2.5 cm/sec range. It is necessary to have a dynamic system to synthesize silicon nitride; the thermodynamically stable species under static conditions is silicon oxynitride. However, at gas velocities greater than 3 cm/sec a substantial loss of mass is observed because the flowing gas is sweeping out from the reaction zone the gaseous silicon monoxide, formed by the reactions described in Eq. 2 and 3, before it can react to form silicon nitride.

Figure 2:
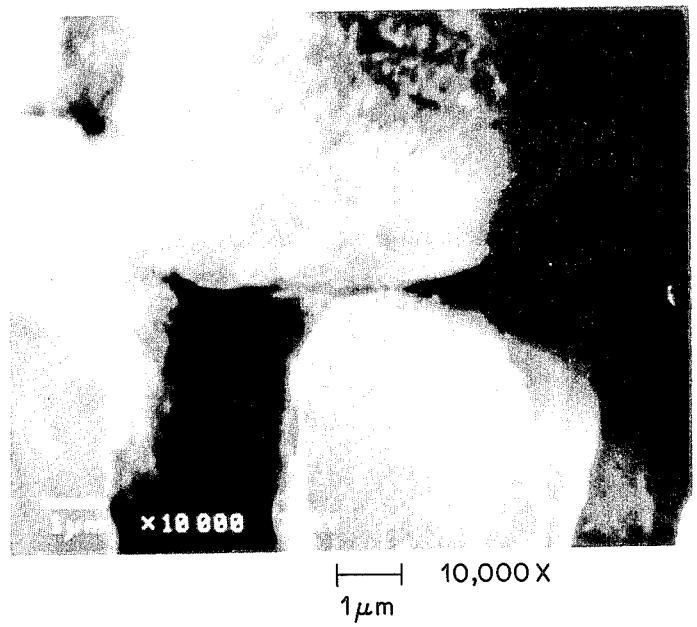
FIG. 2 is a SEPM of the same silicon nitride powder shown in FIG. 1 but at a magnification of 10,000 times (10,000×).
Figure 3:
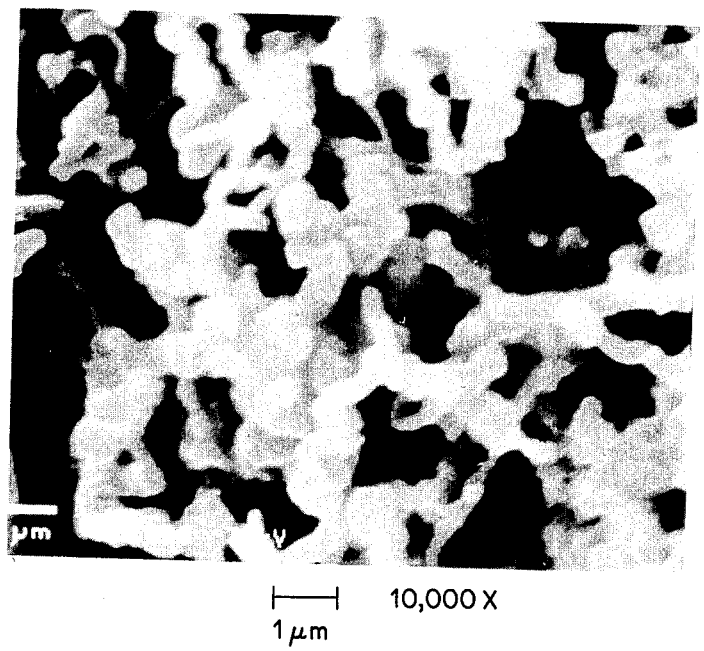
FIG. 3 is a SEPM of a silicon nitride powder made by the process of the instant invention depicting the effect of increased gas velocity on the morphology of the resulting silicon nitride powder. The SEPM is magnified 10,000 times (10,000×).

The gas velocity affects the particle morphology of the synthesized silicon nitride as well as the yield. Thus, it was found unexpectedly that when two portions of the same reactant mixture of carbon and silicon dioxide are reacted at the same temperature and for the same length of time but with different nitrogen gas velocity, the shape and the size of the resulting silicon nitride crystallites is substantially different. This is demonstrated in FIGS. 1, 2 and 3. FIG. 3 is a scanning electron photomicrograph (SEPM) at a magnification of 10,000× of a silicon nitride powder made by the process of this invention with a nitrogen gas velocity of 2.5 cm/sec; FIG. 2 is a SEPM at the same magnification, 10,000×, of a powder synthesized from the same reactant mixture, in the same furnace and at the same temperature/time cycle but at about half the nitrogen gas velocity, 1.2 cm/sec. FIG. 1 is a SEPM of the latter powder but at 10 times lower magnification, 1,000×, to provide a more representative view of the shape and size of the crystallites. Whereas the material synthesized at the higher gas velocity shows a typical size and morphology, consisting of small crystallites of various aspect ratios (FIG. 3), it is evident that the silicon nitride particles made at the slower gas velocity are much larger, equiaxed and fairly uniform in size (FIGS. 1 and 2). Such powder characteristics may be particularly advantageous for ceramic shape making techniques such as injection molding, extruding or isostatic pressing. It is thought that at slower gas velocity the nucleation of the individual silicon nitride crystallites occurs in a homogeneous manner and, under the less turbulent conditions, crystal growth occurs uniformly on the already formed nuclei. This results in a well-crystallized powder of fairly uniform size and shape (FIGS. 1 and 2).

Figure 4:
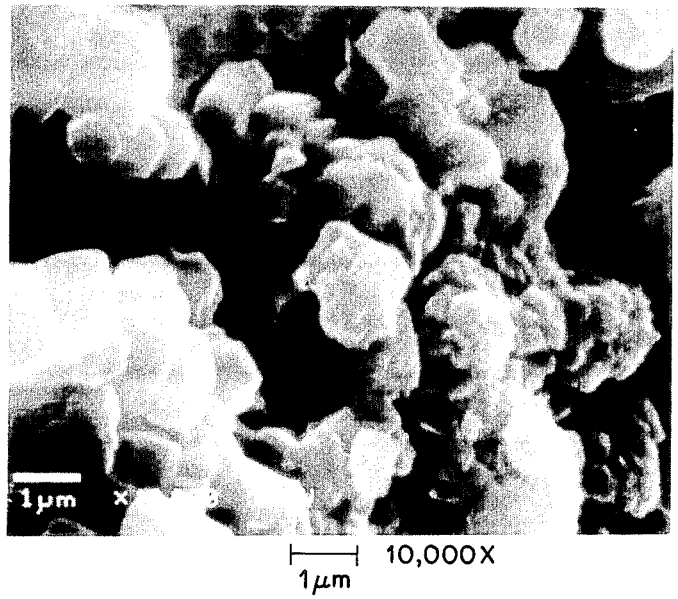
FIG. 4 is a SEPM of a silicon nitride powder made by the process of the instant invention depicting the effect of using Monarch 800 carbon on the morphology of the silicon nitride powder. The SEPM is magnified 10,000 times (10,000×).

The powder morphology is also affected by the type of carbon material used in the reactant mixture. This is demonstrated by three powders, shown in FIGS. 4, 5 and 6, which were processed identically and contain the same ratio of carbon to silicon dioxide except that a different carbon material was used in each reaction mixture. The silicon nitride powder made using Monarch 800 carbon (manufactured by the Cabot Corporation, Boston, MA) exhibited equiaxed, well-crystallized, fairly large particles of hexagonal cross section, shown in FIG. 4. The powder made using Desulco 9039 carbon (manufactured by the Superior Graphite Company, Chicago, IL) has a different morphology shown in FIG. 5. It consisted of elongated crystals as well as of irregular crystallites. The powder made form the Conductex carbon (manufactured by Columbian Chemicals Company, Tulsa, OK) was still different from the first two, see FIG. 6. It consisted of poorly-crystallized small particles which exhibited hexagonal symmetry and tended to form bridge-like structures. The x-ray diffraction data of all the powders are equivalent, showing alpha-$Si_3N_4$ as the major phase and some presence of beta-$Si_3N_4$ so that the various morphologies cannot be ascribed to crystallographic differences. It is hypothesized that these differences in particle morphology are caused by minute differences in trace level metallic impurities in the carbon because it is not likely that carbon, which is a volatile component of the reaction system, would affect particle nucleation. In any case, this unexpected phenomenon provides a means of selecting and controlling powder morphology through the use of different carbon reactants which are comparable in price and result in silicon nitride materials of comparable quality.

The reactant mixture of carbon and silicon dioxide is sufficiently fluffy so that the gaseous species can readily access the bottom layer of the powder in the refractory container during the synthesis reaction and effect complete conversion of silicon dioxide to silicon nitride. Thus, reactant mixture charges with bed depths of up to 35 mm are fully converted to silicon nitride. No differences in the x-ray diffraction patterns or other material properties were detected in the materials taken from the top, middle and bottom layer of a boat with a semicircular cross section of 35 mm inside radius (this was the largest that could be accommodated in the tube furnace used in these experiments). This is unexpected in view of published reports specifying a bed depth of no more than 5 mm for complete conversion in similar reactions. It is thought that the greater bed depth possible in the process of this invention (and bed depths exceeding 50 mm are likely to be feasible in larger furnaces) are a result of the high reactivity and fluffiness of the reactant mixture. It is clear that the unit processing costs are reduced with increased bed depth of the reactant charge.

The product of the reaction is silicon nitride and a residue of the excess carbon present in the reactant mixture. This carbon is readily oxidized and volatilized by a heat treatment at 600°–700° C. in air for a few hours. Pure silicon nitride powder is obtained after this processing step, the properties of which are suitable for structural ceramic applications.

The following examples illustrate the features of this invention; they are not to be construed as limiting in scope but rather as teaching those skilled in the art the procedures and methodology of this invention.

EXAMPLE I

In a typical preparation, 200 g of M-5 silicon dioxide were mixed with 400 g of Monarch 800 carbon, oil absorption 75 ml/100 g, (both materials manufactured by Cabot Corporation, Boston, MA) in 2.4 liters of deionized water until a fluid slurry was obtained. This slurry was then poured into flat dishes and dried at 170°–180° C. overnight. The dried cake was broken up into a fluffy powder. About 100 g of this powder were loaded into a graphite boat and heat treated in a tube furnace at 1480° C. for four hours in a stream of nitrogen flowing at a velocity of 2.5 cm/sec. After cooling the graphite boat was pulled out of the reaction furnace and its content transferred to a quartz tray. The tray was then heated in a muffle furnace in air at 680° C. for several hours to oxidize off the carbon residue. The residue of this step is silicon nitride powder.

The yield of silicon nitride resulting from this synthesis is about 85–90%, based on the amount of silicon dioxide in the reaction mixture. The x-ray diffraction pattern shows predominantly alpha-$Si_3N_4$ with a small admixture of an amorphous phase. Chemical analysis of this material shows it to contain 58.8 w/o silicon, 38.4 w/o of nitrogen, 1.7 w/o of oxygen and 0.6 w/o of carbon. The oxygen content is deliberate because its presence in the amount of about 2 w/o is advantageous to the sinterability of the material in the particular formulation selected for its high mechanical strength and oxidation resistance. The morphology of the powder is equivalent to that depicted in FIG. 3.

Pellets were sintered from this material using 6 w/o $Y_2O_3$ as sintering aid to a density exceeding 99% of the theoretical density. The modulus of rupture determined in a four-point test on polished bars cut from an isostatically pressed and sintered billet is 87 ksi; that measured on polished bars cut from a hot-pressed billet is 140 ksi. The weight gain per unit area after 564 hours in air at 1000° C. is $1.9 \times 10^{-3}$ kg m$^{-2}$; the linear oxidation rate constant at 1000° C. is $K_L = 6.4 \times 10^{-10}$ kg m$^{-2}$sec$^{-1}$. At 1350° C. the weight gain per unit area after 564 hours exposure in air is $4.9 \times 10^{-3}$ kg m$^{-2}$. The parabolic oxidation rate constant at 1350° C. is thus $K_p = 9.1 \times 10^{-12}$ kg$^2$ m$^{-4}$ sec$^{-1}$. These oxidation resistance data were obtained on polished bars cut from an isostatically pressed and sintered billet. The sinterability, mechanical strength and oxidation resistance of this material compares favorably with that of ceramics of this formulation made from any other silicon nitride powder which is an article of commerce.

EXAMPLE II

A silicon nitride powder was made in an identical manner to that described in Example I, except that the carbon used in the reactant mixture was the Pearlite grade, manufactured by the Cabot Corporation, Boston, MA. The powder properties were similar to those of the material synthesized in Example I. The powder was sintered in the PY6 ($Si_3N_4$ with 6 w/o $Y_2O_3$ as sintering aid) formulation to a density exceeding 99% of theoretical. The modulus of rupture of polished bars cut from an isopressed and sintered billet was 89 ksi. The linear oxidation rate constant at 1000° C. is $K_L = 3.4 \times 10^{-10}$ kg m$^{-2}$ sec$^{-1}$; the parabolic oxidation rate constant at 1350° C. is $K_p = 2.2 \times 10^{-12}$ kg$^2$m$^{-4}$ sec$^{-1}$. The oxidation test was performed for 500 hours in air at the respective temperatures.

EXAMPLE III

A silicon nitride powder was synthesized by the same procedure as described in Example I except that the carbon used was Monarch 1100, oil absorption 60 ml/100g, a grade manufactured by the Cabot Corporation, Boston, MA. The x-ray diffraction pattern of the product showed alpha-$Si_3N_4$ as the major phase with a weak phase of beta-$Si_3N_4$ also present. The analysis of the powder shows 58.7% of silicon, 37.8 w/o of nitrogen, 2.4 w/o of oxygen and 0.9 w/o carbon.

This powder is sinterable in the PY6 formulation to densities exceeding 99% of the theoretical. The modulus of rupture of polished bars cut from isostatically pressed and sintered billet is 77 ksi at room temperature. The material retains its strength to 1400° C. at which temperature the MOR value is still 70 ksi. The MOR values at the intermediate temperatures of 1000° C. and 1200° C. are 91 ksi and 64 ksi, respectively.

The linear oxidation rate constant measure on polished bars cut from the isopressed and sintered billet at 1000° C. is $K_L = 3.6 \times 10^{-10}$ kg m$^{-2}$ sec$^{-1}$. The parabolic oxidation rate constant at 1350° C. is $K_p = 1.8 \times 10^{-14}$ kg$^2$m$^{-4}$sec$^{-1}$. The oxidation test was run for 500 hours in air at each of these temperatures.

EXAMPLE IV

Figure 6:
FIG. 6 is a SEPM of a silicon nitride powder made by the process of the instant invention depicting the effect of using Conductex carbon on the morphology of the silicon nitride powder. The SEPM is magnified 10,000 times (10,000×).

A silicon nitride powder was prepared in a manner identical to that described in Example I except that the carbon used in the synthesis was the Conductex grade made by the Columbian Chemicals Company, Tulsa, OK. The powder properties were equivalent to those listed in Example I. The powder morphology is depicted in FIG. 6. The powder is sinterable in the PY6 formulation to densities exceeding 99% of theoretical. The modulus of rupture of bars cut from isostatically pressed and sintered billets is 79 ksi at room temperature, 80 ksi at 1000° C., 86 ksi at 1200° C. and 70 ksi at 1400° C., demonstrating the superior strength of this material over a broad temperature range.

The oxidation behavior was evaluated on polished bars cut from an isostatically pressed and sintered billet in a heat treatment in air for 675 hours at 1000° C. and 1350° C. At 1000° C. the linear oxidation rate constant is $K_L = 2.4 \times 10^{-10}$ kg m$^{-2}$ sec$^{-1}$. The parabolic oxidation rate constant at 1350° C. is $K_p = 3.1 \times 10^{-12}$ kg$^2$ m$^{-4}$ sec$^{-1}$.

EXAMPLE V

Figure 5:
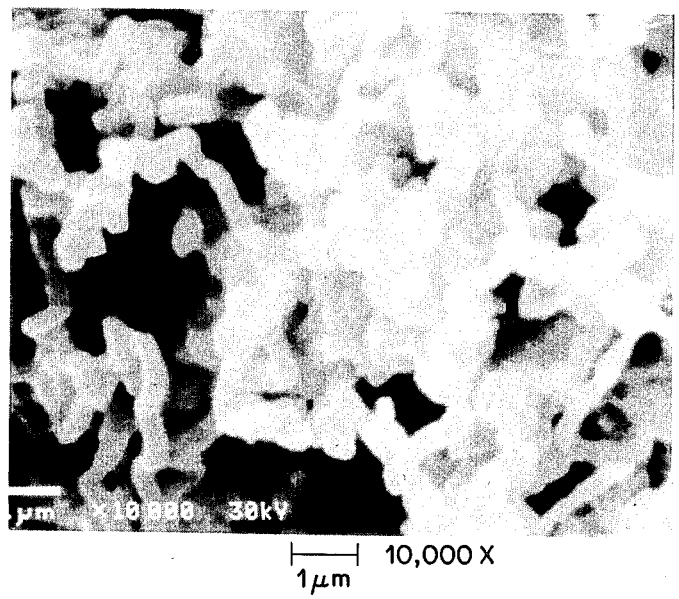
FIG. 5 is a SEPM of a silicon nitride powder made by the process of the instant invention depicting the effect of using Desulco 9039 carbon on the morphology of the silicon nitride powder. The SEPM is magnified 10,000 times (10,000×).

A silicon powder was made by the method described in Example I except that the carbon used in the reactant mixture was Desulco 9039, manufactured by the Superior Graphite Company, Chicago, IL. The powder morphology is shown in FIG. 5. Its properties are equivalent to those of the material described in Example I. Dense ceramics, exceeding 99% of theoretical density, were sintered from this powder upon addition of 6 w/o $Y_2O_3$ as sintering aid. The modulus of rupture values of polished bars cut from an isopressed and sintered billet are: 84 ksi at room temperature, 104 ksi at 1000° C., 78 ksi at 1200° C. and 71 ksi at 1400° C. showing the excellent strength of this material at high temperature.

EXAMPLES VI–XXXIX

Silicon nitride powders were also prepared successfully from various combinations of reactants and under different reaction conditions. Representative examples of these are listed in Table I.

TABLE I

| Example No. | Reactants SiO$_2$ | Reactants C | C:SiO$_2$ Ratio | Reaction Temp. (°C.) | N$_2$ Velocity (cm/sec) | α-Si$_3$N$_4$ | β-Si$_3$N$_4$ | Amorphous |
|---|---|---|---|---|---|---|---|---|
| VI | S17 (1) | Monarch 800 (1) | 2:1 | 1480 | 2.5 | Major | Minor | Major |
| VII | HS5 (1) | Monarch 800 (1) | " | " | " | Major | Minor | Minor |
| VIII | Petrarch S1510 (2) | Monarch 800 (1) | " | " | " | Minor | — | Major |

TABLE I-continued

| Example No. | Reactants SiO₂ | C | C:SiO₂ Ratio | Reaction Temp. (°C.) | N₂ Velocity (cm/sec) | α-Si₃N₄ | β-Si₃N₄ | Amorphous |
|---|---|---|---|---|---|---|---|---|
| IX | Petrarch S1520 (2) | Monarch 800 (1) | " | " | " | Major | Minor | Minor |
| X | Alfa 89709 (3) | Monarch 800 (1) | " | " | " | Major | Minor | Major |
| XI | Alfa 89710 (3) | Monarch 800 (1) | " | " | " | Major | Minor | Minor |
| XII | M5 (1) | Monarch 800 (1) | 3:1 | " | " | Strong | Weak | — |
| XIII | M5 (1) | Monarch 800 (1) | 1.5:1 | " | " | Strong | Weak | — |
| XIV | M5 (1) | Monarch 800 (1) | 2:1 | 1450 | " | Strong | Weak | — |
| XV | M5 (1) | Monarch 800 (1) | " | " | 1.2 | Strong | Weak | — |
| XVI | M5 (1) | Monarch 800 (1) | " | 1480 | " | Strong | — | Weak |
| XVII | M5 (1) | Monarch 1100 (1) | " | " | " | Major | Minor | — |
| XVIII | M5 (1) | Monarch 1100 (1) | 1.5:1 | " | 2.5 | Strong | Weak | — |
| XIX | M5 (1) | Monarch 1100 (1) | 1:1 | " | " | Major | Minor | Major |
| XX | M5 (1) | Monarch 1100 (1) | 2:1 | 1510 | " | Single Phase | — | — |
| XXI | M5 (1) | Conductex (4) | " | 1450 | " | Single Phase | — | — |
| XXII | M5 (1) | Desulco 9039 (5) | " | " | " | Major | Weak | Weak |
| XXIII | M5 (1) | Desulco 9035 (5) | " | 1480 | " | Major | Minor | Weak |
| XXIV | M5 (1) | Desulco 9033 (5) | " | " | " | Major | Minor | Major |
| XXV | M5 (1) | Desulco 9026 (5) | " | " | " | Major | Minor | Major |
| XXVI | M5 (1) | Regal 300R (1) | " | " | " | Major | Minor | Minor |
| XXVII | HS5 (1) | Regal 300R (1) | " | " | " | Major | Minor | Minor |
| XXVIII | S17 (1) | Regal 300R (1) | " | " | " | Major | Minor | Minor |
| XXIX | M5 (1) | Regal 660R (1) | " | " | " | Strong | Possible | Weak |
| XXX | M5 (1) | Regal 400R (1) | " | " | " | Strong | — | Weak |
| XXXI | M5 (1) | Sterling R (1) | " | " | " | Strong | Weak | Weak |
| XXXII | M5 (1) | Mogul L (1) | " | 1450 | " | Single Phase | — | — |
| XXXIII | M5 (1) | Vulcan (1) | " | 1480 | " | Major | Minor | Weak |
| XXXIV | M5 (1) | Monarch 1300 (1) | " | 1450 | " | Major | Minor | Weak |
| XXXV | M5 (1) | Ashland 642 (6) | " | 1480 | " | Minor | Minor | Minor |
| XXXVI | M5 (1) | Ashland N358 (6) | " | " | " | Major | Minor | Major |
| XXXVII | M5 (1) | Ashland N326 (6) | " | " | " | Major | Minor | Major |
| XXXVIII | M5 (1) | Raven 8000 (4) | " | " | " | Major | Minor | Minor |
| XXXIX | M5 (1) | ICP (7) | " | " | " | Strong | Weak | Weak |

(1) Manufactured by Cabot Corporation, Boston, MA
(2) Distributed by Petrarch Systems Inc., Levittown, PA
(3) Distributed by Alfa Products, Danvers, MA
(4) Manufactured by Columbian Chemicals Company, Tulsa, OK
(5) Manufactured by Superior Graphite Company, Chicago, IL
(6) Manufactured by Ashland Chemical Company, Columbus, OH
(7) Product of International Minerals and Chemical Corporation, Des Plaines, IL The above examples illustrate that the silicon nitride powders made by the method of this invention have superior properties. Furthermore, the ceramics made from these powders show excellent mechanical strength at room and elevated temperatures. Their oxidation resistance at 1000° C. and 1350° C. is at least equivalent, if not better, than that of other silicon nitride ceramics. All these factors demonstrate the usefulness of these materials for structural ceramic applications under severe thermal and mechanical stresses. The method of this invention allows for the manufacture of these powders by simple, and therefore, cost-effective technology, using standard off-the-shelf inexpensive industrial feedstocks. The synthesis as taught in this invention provides for excellent control of the process and therefore good and consistent product.

The superiority of the ceramics made from the powders prepared by the method of this invention is evident from the date summarized in Table II. In it, the modulus of rupture and oxidation resistance of sintered PY-6 ceramics, that is Si₃N₄ ceramics containing 6 w/o of Y₂O₃ as sintering aid, made from three different powders synthesized according to the teachings of this invention are compared to those of PY-6 ceramics made from commercially available high-grade Si₃N₄ powders. The ceramic processing and sintering schedules were identical for all the materials evaluated, as were the test procedures. The modulus of rupture was determined on polished test bars in a four-point test in the indicated temperature range (from room temperature to 1500° C.). The oxidation tests were also performed on polished bars by heating separate samples in air for at least 500 hours at 1000° C. and 1350° C.

The data show that the ceramics prepared from powders made by the method of this invention are clearly stronger at elevated temperatures. This is important because the PY-6 ceramic formulation is designed for operation in high thermal and mechanical stress environments such as prevalent in advanced heat engines. Materials such as these offer improved performance reliability by exceeding the material design criteria by a comfortable margin. Furthermore, the strength of these ceramics is retained quite well throughout the RT-1400° C. range, whereas other materials show a characteristic drop-off in MOR values at 1400° C. Indeed, the strength of these ceramics at 1500° C. is comparable to that of other materials at 1400° C. It is also noteworthy that a commercial powder made by the carbothermal technique results in a poor ceramic. This shows that powders synthesized by the method of this invention are unique in that they lead to excellent ceramic materials.

The oxidation resistance data show that the PY-6 ceramics made from the powders of this invention are comparable to the standard of the industry, the Si₃N₄ material SN502 made by the Chemical and Metallurgical Division, GTE Products Corporation. They are superior to some of the commercial powders at 1350° C.

The superior mechanical strength of materials made from powders prepared by the method of this invention is also evident in hot-pressed PY-6 ceramics. This is shown by the data in Table III which compares the properties of a hot-pressed PY-6 ceramic made from the powder of Example I to those of a PY-6 ceramic made from a commercial Si₃N₄ (SN502) powder which is generally accepted as an industry standard. Both materials were processed in an identical manner and evaluated by identical techniques as described above. Polished bars of the two materials were placed side-by-side in the respective furnaces during the oxidation tests.

The data in Table III show that the mechanical strength of the PY-6 ceramic hot-pressed from the powder made as described in Example I is substantially higher than that of the standard material, particularly at high temperatures. This is consistent with the observation made on sintered PY-6 ceramics made from these powders which also showed superior strength at elevated temperatures as compared to other materials. The oxidation resistance of the hot-pressed ceramic is equivalent to that of the standard and somewhat better than that of the sintered ceramic made from the same powder which is given in Example I.

The densified ceramic articles maybe prepared by hot pressing, hot isostatic pressing, or by any pressureless sintering step preceded by a suitable consolidation step such as dry pressing, isostatic pressing, extruding, slip casting, injection molding, etc. See U.S. Pat. No. 4,425,141 for general procedures for sintering and hot pressing.

The sintered PY6 ceramic samples were sintered at 1950° C. for 4 hours and the hot pressed PY6 samples were hot pressed at 1725° C. and 5,000 psi until ram travel was less than 0.004 inches per hour.

tion, it will be obvious to those skilled in the art that various changes and modifications may be made therein without departing from the scope of the invention as defined by the appended claims.

What is claimed is:

1. A method for making silicon nitride powder comprising the steps:
   Step 1  mixing carbon and silicon dioxide having a weight ratio from about 1 to about 4 to form a homogeneous powder mixture;
   Step 2  heating the powder mixture from step 1 from about 1400° C. to about 1550° C. in a nitrogen stream for a time sufficient to form silicon nitride, the nitrogen stream having a velocity from about one to about 3 cm/sec, said carbon having an oil absorption value less than 100 ml/100 g; and
   Step 3  heat treating the product from step 2 in air at about 600° C. to about 700° C. for a time sufficient to completely oxidize residual carbon.

2. A method for making silicon nitride powder in accordance with claim 1 wherein the carbon and silicon dioxide have a weight ratio from about 1.5 to about 2.0.

3. A method for making silicon nitride powder in accordance with claim 1 wherein the velocity of the nitrogen is from about 1.2 to about 2.5 cm/sec.

4. A method for making silicon nitride powder in accordance with claim 1 wherein step 2 comprises heating the powder mixture from step 1 in a tray from about 1400° C. to about 1550° C. in a nitrogen stream for about 2 to about 10 hours to form silicon nitride, the nitrogen stream having a velocity from about one to about 3 cm/sec, the powder mixture from step 1 being in the tray at a depth greater than 5 mm.

5. A method for making silicon nitride powder in accordance with claim 4 wherein the depth of the powder mixture from step 1 in the tray is about 35 mm.

6. A ceramic article comprising silicon nitride and a densification aid, the ceramic article having a modulus of rupture at 1400° C. equal to or greater than 70 ksi and an oxidation rate at 1350° C. equal to or less than $4.4 \times 10^{-12}$ $Kg^2 m^{-4} sec^{-1}$, the silicon nitride in the ceramic article being made by the method comprising the steps:
   Step 1  mixing carbon and silicon dioxide having a weight ratio from about 1 to about 4 to form a homogeneous powder mixture;

TABLE II

PROPERTIES SINTERED PY-6 CERAMICS MADE FROM VARIOUS SILICON NITRIDE POWDERS

| POWDER | SOURCE | SYNTHESIS METHOD | MODULUS OF RUPTURE VALUES (ksi at T °C.) | | | | | OXIDATION RATE CONSTANTS | |
|---|---|---|---|---|---|---|---|---|---|
| | | | RT | 1000 | 1200 | 1400 | 1500 | $K_L$ at 1000° C. $[10^{-10} kgm^{-2} sec^{-1}]$ | $K_p$ at 1350° C. $[10^{-12} kg^{-2} m^{-4} sec^{-1}]$ |
| EXAMPLE III | | $SiO_2 + N_2 + C$ Carbothermic Reduction of $SiO_2$ | 77 | 91 | 64 | 70 | 50 | 3.6 | 0.02 |
| EXAMPLE IV | | $SiO_2 + N_2 + C$ Carbothermic Reduction of $SiO_2$ | 79 | 80 | 86 | 70 | 33 | 2.9 | 4.4 |
| EXAMPLE V | | $SiO_2 + N_2 + C$ Carbothermic Reduction of $SiO_2$ | 84 | 104 | 78 | 71 | 45 | — | — |
| α-Si₃N₄ | TOSHIBA | $SiO_2 + N_2 + C$ Carbothermic Reduction of $SiO_2$ | 45 | — | — | 40 | — | — | — |
| SN E-10 | Ube | $SiCl_4$ (or percursor) + $NH_3$ at low temperature | 75 | 59 | 32 | 46 | — | 4.2 | 18.8 |
| TS-7 | Toyo Soda | $SiCl_4$ (or percursor) + $NH_3$ at low temperature | 53 | 66 | 58 | 46 | — | 2.6 | 17.1 |
| SN 502 | GTE | $SiCl_4 + NH_3$ Vapor Phase Reaction | 90 | 75 | — | 55 | 32 | 1.4 | 1.0 |
| P-95 | Kema Nord | $Si + N_2$ Nitridation of Silicon | 57 | — | — | 30 | — | — | — |

TABLE III

Comparison of Properties of Hot-Pressed PY-6 Ceramics

| Si₃N₄ Powder Synthesis Method | GTE's SN502 $SiCl_4 + NH_3$ (vapor phase reaction) | Example I $SiO_2 + N_2 + C$ (carbothermic reduction) |
|---|---|---|
| Modulus of rupture | | |
| ksi at room temperature | 116 | 140 |
| ksi at 1200° C. | — | 118 |
| ksi at 1400° C. | 66 | 94 |
| Oxidation Resistance | | |
| (554 hours at 1000° C.) $K_L$ (kg m⁻² sec⁻¹) | $1.6 \times 10^{-10}$ | $1.8 \times 10^{-10}$ |
| (510 hours at 1350° C.) $K_P$ (kg² m⁻⁴ sec⁻¹) | $7.0 \times 10^{-12}$ | $4.2 \times 10^{-12}$ |

While there have been shown what are at present considered to be the preferred embodiments of the inven- Step 2 heating the powder mixture from step 1 from about 1400° C. to about 1550° C. in a nitrogen stream for a time sufficient to form silicon nitride, the nitrogen stream having a velocity from about one to about 3 cm/sec, said carbon having an oil absorption value less than 100 ml/100 g; and Step 3 heat treating the product from step 2 in air at about 600° C. to about 700° C. for a time sufficient to completely oxidize residual carbon.

7. A ceramic article in accordance with claim 6 wherein said densification aid is about 6 w/o yttria.

8. A ceramic article comprising silicon nitride and a densification aid, the ceramic article having a modulus of rupture at 1400° C. equal to or greater than 70 ksi and an oxidation rate at 1350° C. equal to or less than $4.4 \times 10^{-12}$ $Kg^2m^{-4}sec^{-1}$, the ceramic article being made by the method comprising the steps:

Step 1 mixing carbon and silicon dioxide having a weight ratio from about 1 to about 4 to form a homogeneous powder mixture.

Step 2 heating the powder mixture from step 1 from about 1400° C. to about 1550° C. in a nitrogen stream for a time sufficient to form silicon nitride, the nitrogen stream having a velocity from about one to about 3 cm/sec, said carbon having an oil absorption value less than 100 ml/100 g;

Step 3 heat treating the product from step 2 in air at about 600° C. to about 700° C. for a time sufficient to completely oxidize residual carbon;

Step 4 mixing the produce from step 3 with a densification aid; and

Step 5 densifying the product from step 4 to form a ceramic article.

9. A ceramic article in accordance with claim 8 wherein step 5 is isostatic pressing and sintering the product from step 4 to form a ceramic article having a density greater than 99% of theoretical.

10. A ceramic article in accordance with claim 8 wherein step 5 is hot pressing the product from step 4 to form a ceramic article having a density greater than 99% of theoretical.

11. A ceramic article in accordance with claim 6 wherein step 2 comprises heating the powder mixture from step 1 in a tray from about 1400° C. to about 1550° C. in a nitrogen stream for about 2 to about 10 hours to form silicon nitride, the nitrogen stream having a velocity from about one to about 3 cm/sec, the powder mixture from step 1 being in the tray at a depth greater than 5 mm, said carbon having an oil absorption value less than 100 ml/100 g.

12. A ceramic article in accordance with claim 11 wherein the depth of the powder mixture from step 1 in the tray is about 35 mm.

13. A ceramic article in accordance with claim 8 wherein step 2 comprises heating the powder mixture from step 1 in a tray from about 1400° C. to about 1550° C. in a nitrogen stream for about 2 to about 10 hours to form silicon nitride, the nitrogen stream having a velocity from about one to about 3 cm/sec, the powder mixture from step 1 being in the tray at a depth greater than 5 mm, said carbon having an oil absorption value less than 100 ml/100 g.

14. A ceramic article in accordance with claim 13 wherein the depth of the powder mixture from step 1 in the tray is about 35 mm.

15. A ceramic article in accordance with claim 8 wherein said densification aid is about 6 w/o yttria.

16. A method for making silicon nitride powder in accordance with claim 1 wherein said velocity of said nitrogen stream of step 2 being sufficient to form a silicon nitride powder morphology characterized by the morphology depicted in FIGS. 1 and 2.

17. A method for making silicon nitride powder in accordance with claim 1 wherein said velocity of said nitrogen stream of step 2 being sufficient to form a silicon nitride powder morphology characterized by the morphology depicted in FIG. 3.

* * * * *